March 3, 1959     A. BLAUSTEIN     2,876,320
WIPER CONTACT FOR VARIABLE RESISTANCE DEVICES
Filed Dec. 31, 1956

INVENTOR.
A. Blaustein
BY
Homer R. Montague
ATTY

United States Patent Office 2,876,320
Patented Mar. 3, 1959

2,876,320

WIPER CONTACT FOR VARIABLE RESISTANCE DEVICES

Aaron Blaustein, Hicksville, N. Y., assignor to Fairchild Camera and Instrument Corp., a corporation of Delaware Application December 31, 1956, Serial No. 631,629

4 Claims. (Cl. 201—48)

This invention relates in general to variable resistance devices, and more particularly to the method of manufacture and the structure of the wiper contacts and resistance material utilized in variable resistance devices.

One of the ever present problems existing in the use of variable resistance devices, such as potentiometers, in electronic circuits of all types is the generation of noise as the wiper contact arm is moved over the resistance material. This holds true whether the resistance material is wire wound or a continuous layer of resistance material.

The prior art has attempted in various ways to prevent the generation of such wiper contact noise. In the main, efforts in the prevention or reduction of the noise generated at the wiper contact have been in the direction of making as smooth as possible that portion of the wiper arm which contacts the resistance material. Thus, in accordance with the teaching of the prior art, the manufacture of precision potentiometers in the past has included the step of producing a very smooth contact surface on the wiper arm, as by buffing, polishing and other well-known techniques. Where the resistance element of the potentiometer comprises a wound wire, as distinguished from a deposited resistive coating, the resistance wire has also been given a high polish in order to minimize the generation of contact noise.

In order to improve the mechanical properties of the movable contact element, the prior art has often employed a cupped or bent-up end on the contact arm of many variable resistance devices, resulting in a contact surface of either cylindrical or spherical configuration. While such shapes have the advantage of smooth mechanical motion, they effectively reduce the available contact area between the movable arm and the resistance element to be contacted. Where such surfaces are provided with a smoothly polished finish, the area available for contact is reduced to a minimum. Even where the contact surface is flat, instead of cupped, it sometimes proves extremely difficult to maintain the flat surface in close contact to the resistance element. One example of a cause of such difficulties is the fact that the movable contact arm of the variable resistance device sometimes tends to twist or bend and carry the flat contact surface at an angle to the surface of the resistance element. Under such conditions, the available contact surface is considerably reduced.

Investigation of the noise problem in various types of potentiometers reveals that whenever either the resistance material or the contact area of the wiper blade, or both, are highly polished, the unit still appears to be susceptible to the development of a noise signal too large to be ignored in many applications. This noise appears to be due to the minimization of usable contact area due to the use of highly polished contact surfaces.

The present invention solves the problem by a complete departure from the teachings of the prior art in that a predetermined type and degree of roughness is imparted to that portion of the wiper blade which comes into actual contact with the resistance material. In addition or alternatively, the resistance material itself is given a predetermined degree of roughness.

In general, it has been found that the more points of contact present on that portion of the wiper blade area contacting the resistance material, the greater the minimization of noise. Accordingly, the wiper blade surface of the present invention is characterized by the provision of a roughened finish which presents a large number of contact points to the resistance material.

A principal object of this invention is to provide a variable resistance device that will be relatively free of noise generating properties.

The above as well as other objects and advantages of the invention will become apparent when the following specification is read in conjunction with the attached drawings in which.

Figure 1:
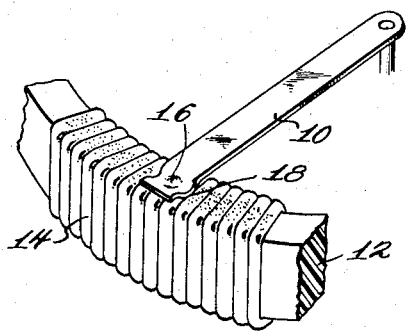
Fig. 1 is a partial perspective view of a variable resistance device in accordance with the present invention.

The variable resistance device of Fig. 1 includes a movable contact arm 10 of conductive material, a base or form 12 and a resistive element 14 shown as a resistance wire wound around the form 12 in the general form of a toroid. The arm 10 has a cupped or otherwise deformed end-portion 16, the contact surface of which is designated by reference numeral 18. It will be understood by those skilled in the art that the variable resistance device of Fig. 1 may take the functional form of a simple variable resistance or that of a potentiometer. In the former, a single conductive path includes one end of the resistance wire 14, that portion of the wire 14 between said end and the point of contact of the arm 10, and the conductive arm 10 itself. In the form of a potentiometer, a voltage is placed across the entire length of the resistance wire 14 and a portion of the applied voltage is tapped off at the point of contact of the arm 10. As is well known, the variation of resistance in either form is obtained by moving the contact arm 10 with respect to the resistance element 14, thereby changing the point of contact of the wiping contact surface of the arm 10 on element 14. The present invention applies equally well to either form, and the terms "variable resistance device" and "potentiometer" are used interchangeably herein.

Figure 2:
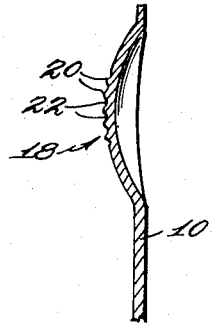
Fig. 2 is a side view of the movable contact arm of the device of Fig. 1, showing in particular the contact surface thereof.

As shown more clearly in Fig. 2, the wiping or contact surface 18 is not a smoothly polished surface as has been the practice in the past. In accordance with the concept of the present invention, the surface 18 is roughened as a step in the manufacture of the variable resistance device, resulting in the irregular surface comprising peaks 20 and valleys 22. To facilitate an easy understanding of the invention, the irregularities in the contact surface 18 are shown disproportionately large with respect to the arm 10. In the actual finished product, the peaks 20 and valleys 22 are of very small magnitude, thus providing a correspondingly large number of such peaks per unit area of contact surface. As previously stated, a large number of such peaks is to be desired in order to present a large number of contact points to the resistance element. The greater number of peaks on the contact surface of the arm 10, the greater is the area of contact between the arm and the resistance element 14. As this contact area is increased, the noise-generating propensity of the variable resistance device is reduced.

Figure 3:
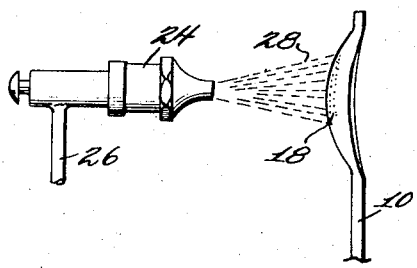
Fig. 3 is a schematic representation of a preferred method of producing the contact surface shown in Fig. 2.

One satisfactory method of obtaining the desired roughened surface on the contact area 18 of the wiper arm 10 is by sandblasting. This method is illustrated in Fig. 3 wherein a potentiometer wiper arm or blade 10 having a curved or cupped contact portion 16 desired to be roughened is subjected to a blast of abrasive issuing from the spray blast nozzle 24 fed by a hose 26 from a source of entrained abrasive. Conventional sandblasting equipment supplying a liquid suspension of abrasive is suitable for the purpose. The abrasive issues from the nozzle 24 in the form of a fine spray 28 which strikes the curved contact portion 18 to form a plurality of peaks 20 and valleys 22 on the working surface 18 as illustrated in a greatly magnified manner in Fig. 3.

It has been found that excellent results are obtained by bombarding the contact surface 18 of the wiper blade 10 with 325-mesh particles of silica grit carried in a high pressure water stream. This of course is merely illustrative and is not considered as limiting the invention either to the size of the grit or the manner in which the grit is applied to the wiper blade. Other modes of roughening the contact area surface may also be used provided the desired degree and quality of roughening is obtained as explained below. In the roughening operation just described, in which the 325-mesh particles of silica grit are wet blasted against the contact area of the wiper blade, the end result is an exceptionally fine rippled surface whose roughness as measured on standard "profilometer" equipment is about 25 microinches, R. M. S. This is in marked contrast to the highly polished surfaces of the wiper blade contact areas of the prior art, which surfaces have measured approximately 1 or 2 microinches R. M. S.

Figure 4:
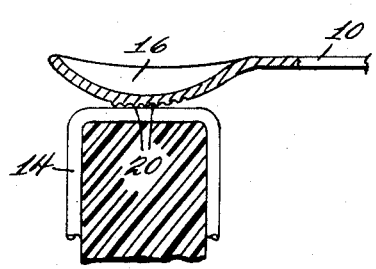
Fig. 4 is a cross-sectional view of the device of Fig. 1 taken on line 4—4.

The reason for the beneficial results of the invention may be deduced from Fig. 4 which illustrates a greatly magnified view of the wiper arm 10 having a curved contact portion 16 in contact with the resistance wire 14 at a plurality of points 20. As stated above, the plurality of contact peaks are about 25 microinches high, R. M. S., and provide a multiple path for the current flowing through the wiper arm 10 and the contact portion 16 with its multiple point contacts 20 to the resistance wire 14 wound on the form 12.

Although the roughness factor is not extremely critical, it has been determined by tests that a roughness measurement of 25 microinches R. M. S. plus or minus 10 microinches R. M. S. gives the best quieting results.

Life tests run on wire wound potentiometers utilizing different resistance wire alloys and sizes of wire show no detrimental effects upon the resistance wire or the characteristics of the potentiometer when the wiper blade contact area is roughened in the manner described above. The results of these tests also show that the noise reducing properties of the wiper blade suffered no marked deterioration with extended use.

Another aspect of this invention is the application of the roughening process to the potentiometer wire itself. In this case, the process may be carried out in the same manner as described in connection with the roughening of the wiper blade contact area. In the potentiometer illustrated in Fig. 1 it would be necessary to roughen only that portion of the resistance wire on the top of the form 12 which will be contacted by the curved portion 16 of the wiper blade 10. The degree of roughness imparted to the resistance wire should be the same as that indicated for the wiper arm contact area, 25 microinches R. M. S. plus or minus 10 microinches.

Figure 5:
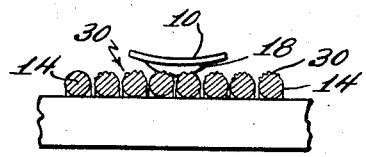
Fig. 5 is a cross-sectional view of the device of Fig. 1 taken on line 5—5.

The result is best illustrated in Fig. 5, in which an exaggerated cross-sectional view of the resistance wire 14 discloses the multiplicity of raised portions 30 formed by roughening that portion of the wire on the top of the form 12 on which the contact surface 18 of the wiper blade or arm 10 rides.

As shown, both the resistance wire 14 and the contact surface 18 have been subjected to the roughening process of the present invention. Satisfactory operation, both mechanically and electrically, has been obtained with both of these surfaces roughened. However, it is to be understood that satisfactory operation may also be obtained with only one of the contact surfaces roughened. Thus, either the contact surface 18 or the corresponding surface of the resistance wire 14 may be roughened with equally good results.

The present invention is particularly concerned with the reduction of moving-contact noise in wire-wound precision potentiometers, but it should be understood that the inventive concept disclosed herein applies equally well to potentiometers or other variable resistance devices in which the contact surface of the movable arm is in operative engagement with a resistance element other than a resistance wire. The most common variable resistance element other than the wound wire is a deposited coating of resistive material, and such resistive coatings are well known to those skilled in the art.

Other methods of producing the desired degree of silky or exceptionally fine rippled surface will occur to those skilled in materials finishing procedures. For example, and depending to some extent upon the material composing the wiper or the wiped surface, and its shape, the desired degree of roughness can be obtained by fine grinding with particulate abrasives of proper mesh, by chemical or electrochemical etching, or by similar known techniques. What is important to obtaining the desired result is the regularity of the degree of roughness produced, as distinguished from the highly variable point-to-point roughness that would result, for instance, from uncontrolled deterioration of an oxidizable surface during its exposure to atmosphere.

While the invention has been described herein in connection with certain specific embodiments given by way of illustration and explanation, it will be understood that various modifications as to detail will occur to those skilled in the art. The scope of the invention claimed is therefore not to be understood as limited by the illustrations and examples given, but only as defined in the appended claims.

What is claimed is:

1. A low-noise variable resistance device of the potentiometer type comprising a movable conductive arm having a wiping electric contact surface, and a resistance element comprising a body of conductive material having an electric contact surface engaged by said wiping contact surface, at least one of said surfaces having a uniformly roughened contact surface of individual peaks and valleys presenting an average surface roughness factor of approximately 25 microinches R. M. S.

2. A variable resistance device in accordance with claim 1, wherein said movable conductive arm has said roughened contact surface.

3. A variable resistance device in accordance with claim 1, wherein said resistance element has said roughened contact surface.

4. A low-noise variable resistance device of the potentiometer type comprising a movable contact arm having a wiping electric contact surface, and a resistance element comprising a body of conductive material having an electric contact surface engaged by said wiping contact surface, at least one of said surfaces being sandblasted to provide a uniformly roughened contact surface of individual peaks and valleys presenting an average surface roughness between 15 and 35 microinches R. M. S.

References Cited in the file of this patent

UNITED STATES PATENTS

| | | |
|---|---|---|
| 2,118,112 | Schellenger | May 24, 1938 |
| 2,295,570 | Dunmore | Sept. 15, 1942 |
| 2,700,719 | Coler et al. | Jan. 25, 1955 |
| 2,739,083 | Brown et al. | Mar. 20, 1956 |